(12) United States Patent
Cho et al.

(10) Patent No.: US 9,408,236 B2
(45) Date of Patent: Aug. 2, 2016

(54) METHOD FOR DISTRIBUTING RANDOM ACCESS, METHOD FOR DISTRIBUTING AND PERFORMING RANDOM ACCESS, AND DEVICE THEREFOR

(75) Inventors: Heejeong Cho, Anyang-si (KR); Youngsoo Yuk, Anyang-si (KR); Eunjong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 378 days.

(21) Appl. No.: 13/812,083

(22) PCT Filed: Jul. 25, 2011

(86) PCT No.: PCT/KR2011/005476
§ 371 (c)(1),
(2), (4) Date: Jan. 24, 2013

(87) PCT Pub. No.: WO2012/015206
PCT Pub. Date: Feb. 2, 2012

(65) Prior Publication Data
US 2013/0121303 A1    May 16, 2013

Related U.S. Application Data

(60) Provisional application No. 61/367,450, filed on Jul. 25, 2010, provisional application No. 61/367,461, filed on Jul. 26, 2010.

(30) Foreign Application Priority Data

Jul. 25, 2011    (KR) .......................... 10-2011-0073768

(51) Int. Cl.
*H04W 4/00* (2009.01)
*H04W 74/08* (2009.01)

(52) U.S. Cl.
CPC ................................. *H04W 74/0833* (2013.01)

(58) Field of Classification Search
None
See application file for complete search history.

(56) References Cited

U.S. PATENT DOCUMENTS

| 2008/0146160 A1* | 6/2008  | Jiang et al. ................. 455/67.11 |
| 2009/0303953 A1* | 12/2009 | Kang et al. ..................... 370/329 |
| 2010/0041399 A1  | 2/2010  | Kim et al. |
| 2011/0026467 A1* | 2/2011  | Wen .................. H04W 72/1284 370/329 |

FOREIGN PATENT DOCUMENTS

| EP | 2207290 A1 * | 7/2010 |
| KR | 10-2008-0079961 A | 9/2008 |

OTHER PUBLICATIONS

Cho, "Machine to Machine (M2M) Communication Study Report (Draft)", IEEE 802.16 Broadband Wireless Access Working Group, IEEE 802.16ppc-10/0002r5, May 3, 2010, 15 pages provided.

(Continued)

*Primary Examiner* — Chi H Pham
*Assistant Examiner* — Raul Rivas
(74) *Attorney, Agent, or Firm* — Birch, Stewart, Kolasch & Birch, LLP (57) ABSTRACT

Disclosed are a method for distributing a random access and a method for distributing and performing the random access. According to the present invention, a method for performing a random access of a terminal comprises the step of receiving a paging message indicative of a network reentry from a base station, wherein said paging message can contain at least either the identifier information of terminal groups, in which terminals are grouped, or the random access configuration information which corresponds to said terminal groups. Said random access configuration information can contain random access standby time information of said terminal groups and back-off window size information. Said method further comprises the steps of: selecting a random access opportunity on the basis of said random access configuration information; and transmitting a random access code to said base station in said selected random access opportunity.

19 Claims, 5 Drawing Sheets

(56) References Cited

OTHER PUBLICATIONS

Huang et al., "Enhanced network reentry from idle mode for M2M devices without mobility", IEEE 802.16 Broadband Wireless Access Working Group, IEEE C80216p-11/00181r1, ITRI, NTHU, Jul. 19, 2011, 8 pages provided.

Yu et al., "Clarification for Non-user specific A-MAP Extension (Section 16.3.6.5)", IEEE 802.16 Broadband Wireless Access Working Group, IEEE C802.16m-10/0549rl, Samsung Electronics Co. Ltd., May 11, 2010, 3 pages provided.

Zhou et al., "Proposed Text for network access entry for a large number of M2M devices", IEEE 802.16 Broadband Wireless Access Working Group, IEEE C802.16p-11/0131r2, China Samsung Telecom R&D Center, Samsung Electronics Co. Ltd., ITRI, LG Electronics, Jul. 20, 2011, 8 pages provided.

* cited by examiner

METHOD FOR DISTRIBUTING RANDOM ACCESS, METHOD FOR DISTRIBUTING AND PERFORMING RANDOM ACCESS, AND DEVICE THEREFOR

CROSS REFERENCE TO RELATED APPLICATIONS

This application is the National Phase of PCT/KR2011/005476 filed on Jul. 25, 2011, which claims priority under 35 U.S.C. 0119(e) to U.S. Provisional Application Nos. 61/367,450 filed on Jul. 25, 2010 and 61/367,461 filed on Jul. 26, 2010, and under 35 U.S.C. 0119(a) to patent Application No. 10-2011-0073768 filed in the Republic of Korea on Jul. 25, 2011, all of which are hereby expressly incorporated by reference into the present application.

TECHNICAL FIELD

The present invention relates to a wireless communication, and more particularly, to a method of distributing a random access, method of distributing and performing a random access and apparatus therefor.

BACKGROUND ART

Broadband wireless communication system is based on an orthogonal frequency division multiplexing (OFDM) scheme, an orthogonal frequency division multiple access (OFDMA) scheme or an orthogonal frequency division multiple access (OFDMA) scheme and enables fast data transmission in a manner of transmitting a physical channel signal using multiple subcarriers.

A downlink data type transmitted to a mobile station by a base station is mainly classified into a multicasting/broadcasting data type and a unicast data type. The multicasting/broadcasting data type can be used by the base station in transmitting such information as system information, configuration information, software upgrade information and the like to at least one or more groups to which non-specific/specific mobile stations belong. And, the unicast data type can be used by the base station in transmitting a request information to a specific mobile station or sending a message containing information (e.g., configuration information) which should be delivered to a specific mobile station only.

Meanwhile, an uplink data type transmitted to a base station, a different mobile station or the like by a mobile station consists of a unicast data type. The mobile station is able to send a message containing information, which will be finally delivered to a different mobile station, a server or the like, to the base station.

A conventional communication was mainly a communication performed between a mobile station used by a user and a base station. Yet, the development of communication technologies has enabled a machine-to-machine communication. The machine-to-machine (hereinafter abbreviated M2M) communication literally means a communication between one electronic device and another electronic device. In a broad sense, the M2M communication may mean a wire/wireless communication between electronic devices or a communication between a human-controllable device and a machine. Recently, the M2M communication may generally indicate a communication between electronic devices, i.e., a device-to-device wireless communication.

In the early 1990's, in which the concept of the M2M communication has been initially introduced, the M2M communication has been recognized as remote control or telematics and derivative markets of the M2M communication were very limitative. Yet, the M2M communication has grown rapidly for past few years and has been introduced into the globally noteworthy markets as well as Korean market. Specifically, in POS (point of sales) and security related application markets, the M2M communication has considerable influence on such field as fleet management, remote monitoring of machinery and equipment, smart meter for auto-measurement of operating time, consumed heat or electricity quantity on construction machinery equipment and the like. M2M communication in the future will be further utilized for various usages in connection with small-scale output communication solutionsfor conventional mobile communication, wireless high-speed internet, Wi-Fi, ZigBee and the like and may lay the foundation of expansion to B2C (business to consumer) markets instead of being confined to B2B (business to business) markets.

In the era of the M2M communication, every machine equipped with SIM card enables data transmission and reception and is capable of remote management and control. For instance, as M2M communication technology is usable for numerous devices and equipments including cars, trucks, trains, containers, auto-vending machines, gas tanks and the like, its application fields may reach far and wide.

As the number of application types of M2M devices keeps increasing, numerous M2M devices may exist within the same base station. When the numerous M2M mobile stations in idle state attempt random accesses, collisions occur more frequently to cause a problem that communication performance is degraded. Such problem may affect a conventional mobile station (e.g., HTC (human type communication)) as well as M2M mobile stations.

However, any efforts or attempts have not been made to research and develop a method of distributing random accesses of M2M mobile stations.

DISCLOSURE OF THE INVENTION

Technical Task

A technical task intended to achieve in the present invention is to provide a method for a base station to distribute a random access of a mobile station in a wireless communication system.

Another technical task intended to achieve in the present invention is to provide a method for a mobile station to perform a random access in a wireless communication system.

Another technical task intended to achieve in the present invention is to provide a base station apparatus for distributing a random access of a mobile station in a wireless communication system.

A further technical task intended to achieve in the present invention is to provide a mobile station apparatus for performing a random access in a wireless communication system.

Technical tasks obtainable from the present invention are non-limited the above mentioned technical tasks. And, other unmentioned technical tasks can be clearly understood from the following description by those having ordinary skill in the technical field to which the present invention pertains.

Technical Solution

To achieve the technical task and in accordance with the present invention, as embodied and broadly described, a method of distributing of mobile stations by a base station in a wireless communication system, according to the present invention may include the step of transmitting a paging message indicating a network reentry to each mobile station group, wherein the paging message includes at least one of an identifier information of the each mobile station group and a random access configuration information of the each mobile station group. Preferably, the random access configuration information includes corresponding random access waiting time information and corresponding backoff window size information of each mobile station group. Preferably, the each mobile station group is grouped based on an application type and property. More preferably, the mobile station includes an M2M (machine to machine) device type. More preferably, the corresponding random access waiting time of the each mobile station group is determined based on a random access priority of the each mobile station group. More preferably, the method further includes the step of receiving a random access code via a random access opportunity (ranging opportunity) in accordance with the corresponding random access waiting time information of the each mobile station group and the corresponding backoff window size information of the each mobile station group from the each mobile station group.

To achieve another technical task and in accordance with the purpose of the present invention, as embodied and broadly described, a method of performing a random access by a mobile station in a wireless communication system, according to the present invention may include the step of receiving a paging message indicating a network reentry from a base station, wherein the paging message includes at least one of an identifier information of a mobile station group having the mobile station grouped therein and corresponding random access configuration information of the mobile station group. Preferably, the random access configuration information includes random access waiting time information of the mobile station group and backoff window size information of the mobile station group. More preferably, the method further includes the step of selecting a random access opportunity based on the random access configuration information. In this case, the method further includes the step of transmitting a random access code to the base station in the selected random access opportunity. Preferably, the grouped mobile station group is grouped based on at least one of an application type of the mobile station and a property of the mobile station. More preferably, the mobile station includes an M2M (machine to machine) device type. More preferably, the random access waiting time of the mobile station group is determined based on a random access priority of the mobile station group.

To achieve another technical task and in accordance with the purpose of the present invention, a base station apparatus for distributing a random access of mobile stations in a wireless communication system according to the present invention may include a transmitter configured to transmit a paging message indicating a network reentry to each mobile station group, wherein the paging message includes at least one of identifier information of the each mobile station group and random access configuration information of the each mobile station group.

To achieve further technical task and in accordance with the purpose of the present invention, a mobile station apparatus for performing a random access in a wireless communication system according to the present invention may include a receiver configured to receive a paging message indicating a network reentry from a base station, wherein the paging message includes at least one of identifier information of a mobile station group having the mobile station grouped therein and a random access configuration information corresponding to the mobile station group. Preferably, the mobile station apparatus further includes a processor configured to select a random access opportunity (ranging opportunity) based on the random access configuration information. More preferably, the mobile station apparatus further includes a transmitter configured to transmit a random access code to the base station in the selected random access opportunity.

Advantageous Effects

According to various embodiments of the present invention, random accesses are distributed per paging mobile station group in a manner of grouping M2M mobile stations and then setting a contention resolution level different per paging mobile station group. And, each of the M2M mobile stations belonging to the same paging mobile station group is enabled to randomly select a value within a configured backoff window range. Therefore, it is advantageous in that the random accesses can be even distributed within the same paging mobile station group.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE

Mode for Invention

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes IEEE (institute of electrical and electronics engineers) 802.16 system or 3GPP ($3^{rd}$ generation partnership project) system, they are applicable to other random mobile communication systems except unique features of IEEE 802.16 system or 3GPP system.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS), and the like. And, assume that a base station is a common name of such a random node of a network stage communicating with a terminal as a Node B, an eNode B, a base station (BS), an access point (AP) and the like.

In a mobile communication system, a mobile station may be able to receive information in downlink from a base station and transmit information in uplink to the base station. The informations transmitted or received by the mobile station may include data and various control informations. And, various kinds of physical channels may exist in accordance with types and usages of the informations transmitted or received by the mobile station.

Figure 1:
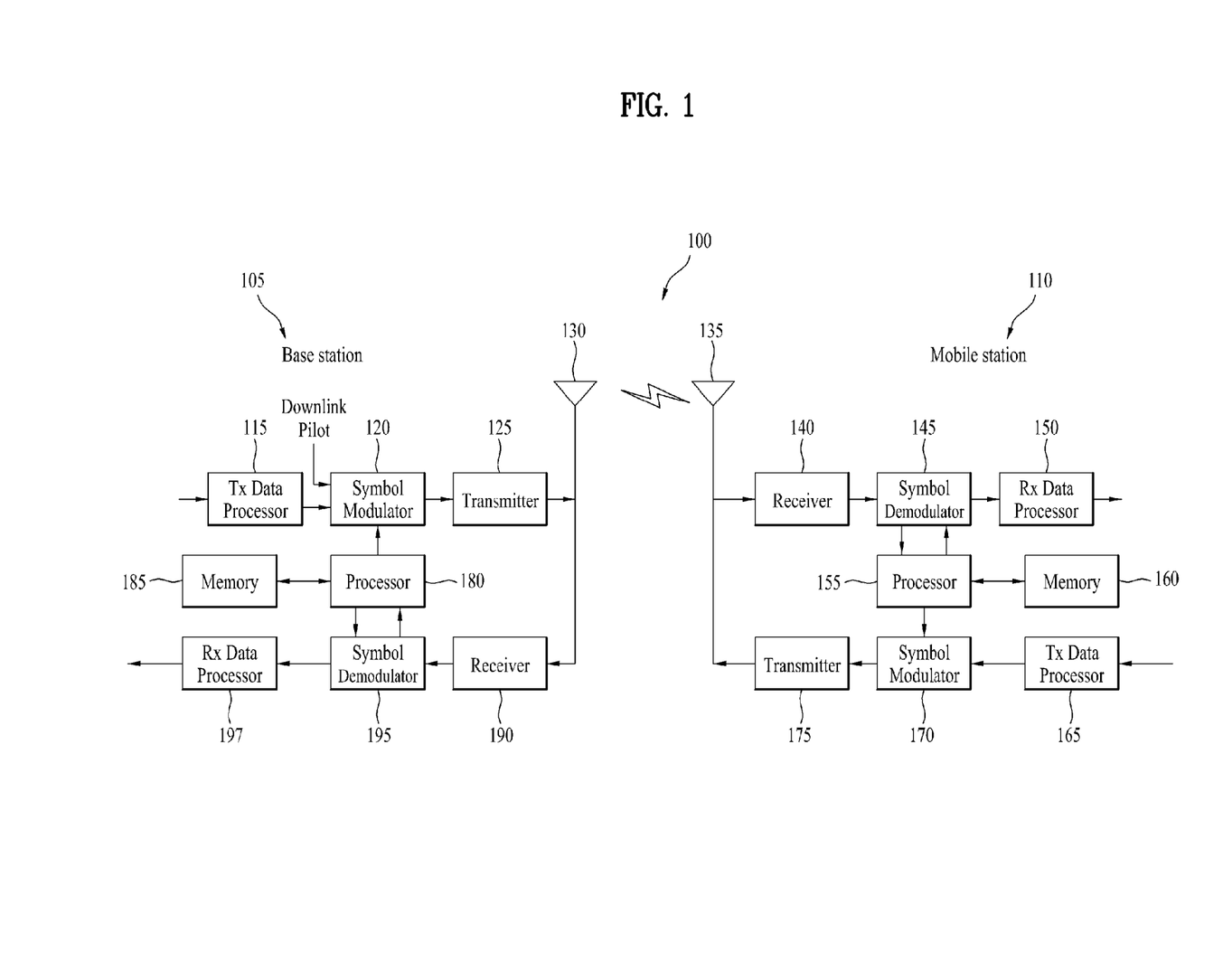
FIG. 1 is a block diagram for configurations of a base station 105 and a mobile station 110 in a wireless communication system 100.

FIG. 1 is a block diagram for configurations of a base station 105 and a mobile station 110 in a wireless communication system 100.

Although one base station 105 and one mobile station 110 are shown in the drawing to schematically represent a wireless communication system 100, the wireless communication system 100 may include at least one base station and/or at least one mobile station.

Referring to FIG. 1, a base station 105 may include a transmitted (Tx) data processor 115, a symbol modulator 120, a transmitter 125, a transceiving antenna 130, a processor 180, a memory 185, a receiver 190, a symbol demodulator 195 and a received data processor 197. And, a mobile station 110 may include a transmitted (Tx) data processor 165, a symbol modulator 175, a transmitter 175, a transceiving antenna 135, a processor 155, a memory 160, a receiver 140, a symbol demodulator 155 and a received data processor 150. Although the base station/mobile station 105/110 includes one antenna 130/135 shown in the drawing, each of the base station 105 and the mobile station 110 includes a plurality of antennas. Therefore, each of the base station 105 and the mobile station 110 according to the present invention supports an MIMO (multiple input multiple output) system. And, the base station 105 according to the present invention may support both SU-MIMO (single user-MIMO) and MU-MIMO (multi user-MIMO) systems.

In downlink, the transmitted data processor 115 receives traffic data, performs coding on the received traffic data by formatting, interleaves the coded traffic data, modulates (or symbol maps) the interleaved data, and then provides modulated symbols (data symbols). The symbol modulator 120 provides a stream of symbols by receiving and processing the data symbols and pilot symbols.

The symbol modulator 120 multiplexes the data and pilot symbols together and then transmits the multiplexed symbols to the transmitter 125. In doing so, each of the transmitted symbols may include the data symbol, the pilot symbol or a signal value of zero (i.e., null). In each symbol duration, pilot symbols may be contiguously transmitted. In doing so, the pilot symbols may include symbols of frequency division multiplexing (FDM), orthogonal frequency division multiplexing (OFDM), time division multiplexing (CDM), or code division multiplexing (CDM).

The transmitter 125 receives the stream of the symbols, converts the received stream to at least one or more analog signals, additionally adjusts the analog signals (e.g., amplification, filtering, frequency upconverting, etc.), and then generates a downlink signal suitable for a transmission on a radio channel. Subsequently, the downlink signal is transmitted to the mobile station via the transmitting antenna 130.

In the configuration of the mobile station 110, the receiving antenna 135 receives the downlink signal from the base station and then provides the received signal to the receiver 140. The receiver 140 adjusts the received signal (e.g., filtering, amplification and frequency downconverting), digitizes the adjusted signal, and then obtains samples. The symbol demodulator 145 demodulates the received pilot symbols and then provides them to the processor 155 for channel estimation.

The symbol demodulator 145 receives a frequency response estimated value for downlink from the processor 155, obtains data symbol estimated values (i.e., estimated values of the transmitted data symbols) by performing data demodulation on the received data symbols, and then provides the data symbol estimated values to the received (Rx) data processor 150. The received data processor 150 reconstructs the transmitted traffic data by performing demodulation (i.e., symbol demapping, deinterleaving and decoding) on the data symbol estimated values.

The processing by the symbol demodulator 145 and the processing by the received data processor 150 are complementary to the processing by the symbol modulator 120 and the processing by the transmitted data processor 115 in the base station 105, respectively.

Regarding the mobile station 110 in uplink, the transmitted data processor 165 provides data symbols by processing the traffic data. The symbol modulator 170 provides a stream of symbols to the transmitter 175 by receiving the data symbols, multiplexing the received data symbols, and then performing modulation on the multiplexed symbols. The transmitter 175 generates an uplink signal by receiving the stream of the symbols and then processing the received stream. The generated uplink signal is then transmitted to the base station 105 via the transmitting antenna 135.

In the base station 105, the uplink signal is received from the mobile station 110 via the receiving antenna 130. The receiver 190 obtains samples by processing the received uplink signal. Subsequently, the symbol demodulator 195 provides pilot symbols received in uplink and a data symbol estimated value by processing the obtained samples. The received data processor 197 reconstructs the traffic data transmitted from the mobile station 110 by processing the data symbol estimated value.

The processor 155/180 of the mobile station/base station 110/105 directs operations (e.g., control, adjustment, management, etc.) of the mobile station/base station 110/105. The processor 155/180 may be connected to the memory unit 160/185 configured to store program codes and data. The memory 160/185 is connected to the processor 155/180 to store operating systems, applications and general files.

The processor 155/180 may be called one of a controller, a microcontroller, a microprocessor, a microcomputer and the like. And, the processor 155/180 may be implemented using hardware, firmware, software and/or any combinations thereof. In the implementation by hardware, the processor 155/180 may be provided with one of ASICs (application specific integrated circuits), DSPs (digital signal processors), DSPDs (digital signal processing devices), PLDs (programmable logic devices), FPGAs (field programmable gate arrays), and the like.

Meanwhile, in case of implementing the embodiments of the present invention using firmware or software, the firmware or software may be configured to include modules, procedures, and/or functions for performing the above-explained functions or operations of the present invention. And, the firmware or software configured to implement the present invention is loaded in the processor 155/180 or saved in the memory 160/185 to be driven by the processor 155/180.

Layers of a radio protocol between a mobile station 110 and a base station 105 may be classified into $1^{st}$ layer L1, $2^{nd}$ layer L2 and $3^{rd}$ layer L3 based on 3 lower layers of OSI (open system interconnection) model well known to communication systems. A physical layer belongs to the $1^{st}$ layer and provides an information transfer service via a physical channel. RRC (radio resource control) layer belongs to the $3^{rd}$ layer and provides control radio resources between UE and network. A mobile station and a base station may be able to exchange RRC messages with each other via a radio communication network using RRC layers.

The above-mentioned device for performing M2M communications may be variously named one of an M2M device, an M2M communication device, an MTC (machine type communication) device and the like. And, aconventional mobile station may be named an HTC (human type communication) mobile station. In the present invention, such a device for performing M2M communications shall be called an M2M device for clarity.

The number of M2M devices will increase gradually in a prescribed network in response to the increasing number of machine application types. The currently discussed machine application types may include (1) security, (2) public safety, (3) tracking and tracing, (4) payment, (5) healthcare, (6) remote maintenance and control, (7) metering, (8) consumer device, (9) POS (Point Of Sales) and fleet Management in security related market, (10) M2M communication of vending machine (11) smart meter for plant and machinery remote monitoring, operating time measurement on measurement on construction plant and machinery and auto-measurement of consumed heat or electricity quantity on construction plant and machinery, (12) surveillance video communication and the like, by which the machine application types may be non-limited. And, there are ongoing discussions on other machine application types. As the number of machine application types increases, the number of M2M communication devices may increase rapidly compared to the number of general mobile communication devices.

Regarding the properties of M2M devices, the M2M device transmits a traffic to a base station on long-term basis or by periods (i.e., periodically) or performs a data transmission in case of occurrence of event triggering. In particular, while staying in idle state mostly, the M2M device wakes up and then enters an active state when a long-term cycle is back or an event is triggered. According to the properties of the M2M device, a prescribed M2M device (e.g., metering, vending machine, etc.) may have low mobility or no mobility at all. And, another M2M device (e.g., tracking and tracing, fleet management, etc.) may have high mobility. As the application types of M2M devices are continuously increasing, numerous M2M devices of the increasing application types will exist in a same base station. Therefore, the base station may need to smoothly support random accesses of numerous M2M mobile stations staying in idle state.

To this end, the base station configures a paging mobile station group (or an M2M group) for the M2M mobile stations in idle state and provides identifier assignment and random access configuration information for the paging mobile station group to each paging mobile station group, thereby supporting a smooth random access by distributing a random access per paging mobile station group and also distributing random accesses of M2M mobile stations within the same paging mobile station group.

First of all, in order to distribute random accesses of paging mobile stations, a base station configures a paging mobile station group and then assigns a paging mobile station group identifier to the configured paging mobile station group. Prior to describing the paging mobile station group identifier, identifiers used to identify conventional mobile stations in a wireless communication system shall be schematically explained as follows. In particular, a process for a base station to send PDCCH to a mobile station in downlink is explained using an example of 3GPP LTE system case.

A base station determines a PDCCH format in accordance with a DCI (downlink control information), which is to be sent to a mobile station, and attaches a CRC (cyclic redundancy check) to a control information. The CRC is masked with a unique identifier, which will be called a radio network temporary identifier (hereinafter abbreviated RNTI), in accordance with an owner or usage of PDCCH. Meanwhile, IEEE 802.16m system uses a terminology called a station identifier (STID) as a concept corresponding to RNTI of 3GPP.

If the PDCCH is provided for a specific mobile station, the CRC can be masked with a unique identifier of a mobile station, e.g., C-RNTI (cell-RNTI). If the PDCCH is provided for a paging message, the CRC can be masked with a paging indication identifier, e.g., P-RNTI (paging-RNTI). If the PDCCH is provided for a system information, the CRC can be masked with a system information identifier, e.g., SI-RNTI (system information-RNTI). In order to indicate a random access response which is the response to a transmission of a random access preamble of a mobile station, the CRC can be masked with RA-RNTI (random access-RNTI). Table 1 shows examples of an identifier that masks the PDCCH.

TABLE 1

| Type | Identifier | Description |
| --- | --- | --- |
| UE-specific | C-RNTI | used for the UE corresponding to the C-RNTI. |
| Common | P-RNTI | used for paging message. |
|  | SI-RNTI | used for system information (It could be differentiated according to the type of system information). |
|  | RA-RNTI | used for random access response (It could be differentiated according to subframe or PRACH slot index for UE PRACH transmission). |
|  | TPC-RNTI | used for uplink transmit power control command (It could be differentiated according to the index of UE TPC group). |

If C-RNTI is used, the PDCCH carries a control information for a corresponding specific mobile station. If a different RNTI is used, the PDCCH carries a shared control information received by all or a plurality of mobile stations within a cell. The base station generates a coded data by performing a channel coding on the CRC attached DCI. The base station then performs a rate matching according to the number of CCEs assigned to the PDCCH format. Subsequently, the base station generates modulated symbols by modulating the coded data. Thereafter, the base station maps the modulated symbols to the physical resource elements. Thus, the base station uses RNTI and STID as mobile station identifiers in LTE system and IEEE 802.16 system, respectively.

Prior to describing a random access distributing method for preventing collision possibly occurring in case of a random access of a paging mobile station operating in idle state, an idle state or an idle mode is explained as follows. First of all, an operation in idle state/mode may indicate the operation of enabling a downlink broadcast traffic transmission to be periodically performed despite that a mobile station is not registered to a specific base station on moving in a radio link environment consisting of multiple base stations in general. In case that the mobile station does not receive traffics from the base station for a predetermined time, the mobile station may be able to enter an idle state to save a power. The mobile station having entered the idle mode receives a broadcast message broadcasted by the base station in an average period (i.e., an available interval) and may be then able to determine whether to enter a normal mode or stay in the idle state. In particular, by performing a location update, the mobile station in the idle state may be able to inform a paging controller of its location.

An idle state may give a benefit to a mobile station by eliminating a handover-related activation request and general management requests. The idle state restricts the activity of the mobile station to a scanning in a discrete cycle, thereby saving a power and operating resources used by the mobile station. In particular, the idle state provides a simple and proper method capable of informing the mobile station of downlink traffics in pending and may give benefits to the mobile station and the base station by eliminating wireless interface and network handover (HO) traffics from an inactive mobile station.

Paging may indicate a function of acquiring a location (e.g., a prescribed base station, a prescribed switching center, etc.) of a mobile station in response to an occurrence of an incoming call in mobile communication. A plurality of base stations supportive of an idle state/mode may be able to configure a paging area in a manner of belonging to a specific paging group. In this case, the paging group indicates a logical group. The object of the paging group is to provide an adjacent range area pageable in downlink if there exists a traffic that targets a mobile station. It is preferable to configure the paging group to satisfy the condition that the paging group is large enough for a specific mobile station to stay most of time within the same paging group but small enough for a paging load to maintain an appropriate level.

The paging group may be able to include at least one base station and one base station can be included in at least one or more paging groups. The paging group is defined by a management system. For the paging group, a paging group-action backbone network message can be used. In particular, a paging controller manages the list of mobile stations in idle state using a paging-announce message corresponding to one of backbone network messages and may also manage an initial paging of every base station belonging to the paging group.

Figure 2:
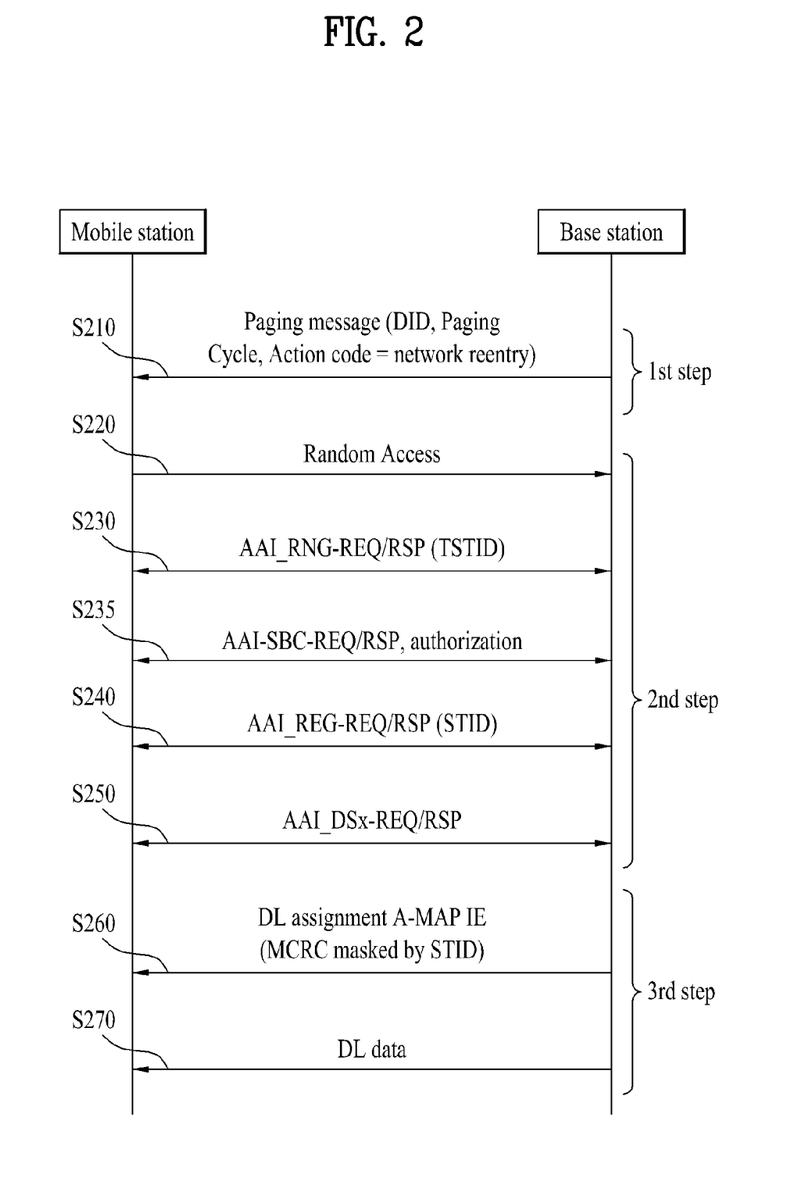
FIG. 2 is a diagram for one example of a process for interaction after network entry or reentry between a base station and an idle state mobile station in IEEE 802.16 system.

FIG. 2 is a diagram for one example of a process for interaction after a network entry or reentry between a base station and an idle state mobile station in IEEE 802.16 system.

Referring to FIG. 2, since a base station does not know the exact locations of mobile stations in idle state for transmitting/receiving data, every base station within a same paging group needs to send a paging message for requiring a network reentry to the corresponding mobile stations. Therefore, for the interaction with the mobile station in idle state, each of the base stations within the same paging group, to which the mobile station(s) belongs, sends a paging message for requiring a network entry or reentry to the corresponding mobile station(s) in a listening interval of the corresponding mobile station(s) [S210].

If information (e.g., at least one of a paging group ID (PGID), a deregistration ID (DID), a paging cycle, etc.) of the mobile station is included in the paging message, the corresponding mobile station needs to perform a procedure to enter an active state [S220]. In particular, each of the idle state mobile stations may be able to perform such a network entry procedure as a random access and the like [S220]. For instance, in IEEE 802.16 system, the idle state mobile station may be able to perform such a network reentry procedure as a ranging, a basic performance negotiation, a registration and the like. Meanwhile, an idle state mobile station in LTE system may be able to perform an RRC connection (re)establishment procedure. In this case, the base station assigns TSTID and STID to the mobile station in idle state in IEEE 802.16 system. Yet, in 3GPP LTE/LTE-A system, the base station may assign RNTI and MTC group identifier (ID) to the mobile station in idle state.

In particular, the idle state mobile station sends a ranging request message (e.g., AAI-RNG-REQ) to the base station and the base station may be then able to send a ranging response message (e.g., AAI-RNG-RSP) containing a temporary STID (TSTID), which is a temporary station identifier, to the idle state mobile station in response to the ranging request message [S230].

The idle state mobile station exchanges SBC-REQ/RSP messages with the base station and may be able to perform an authorization process together with the base station [S235].

The idle state mobile station sends a registration request message (e.g., AAI-REG-REQ) to the base station. In response to the registration request message, the base station assigns an STID to the idle state mobile station and may be then able to send a registration response message (e.g., AAI-REQ-RSP) to the corresponding mobile station in a manner that the assigned STID is contained in the registration response message [S240].

Thereafter, the idle state mobile station and the base station may be able to exchange dynamic service related messages (e.g., AAI-DSx-REQ/RSP) with each other [S250]. The idle state mobile station may be then able to transmit/receive uplink/downlink data to/from the base station [S260].

Regarding FIG. 2, since the base station does not know the exact locations of the mobile stations in idle state, every base station within a same paging group should send a paging message one by one. In doing so, the paging message should be sent in a manner of containing parameters (i.e., a deregistration ID (DID), a paging cycle and a required action (action code) in IEEE 802.16m system) per paged mobile station. However, in a communication environment having numerous M2M mobile stations exist increasing therein, if paging is individually performed on each M2M mobile station in idle state, it may cause huge downlink overhead.

A network may be able to make a request for a network reentry to each of a plurality of M2M mobile stations at the same timing point or in short period. In doing so, when a paging by a conventional mobile station unit is used, as mentioned in the foregoing description, a signaling overhead increases and a paging delay may extend. Hence, if paging is performed not by individual mobile station unit but by group unit, it may be able to considerably reduce a load related to the paging. For instance, if a group identifier and an action code are included in a paging message, a base station may be able to awake all mobile stations belonging to a corresponding group.

Thus, group IDs, for which network entry (reentry) is requested, may exist in a single paging message transmitted by a base station and all M2M mobile stations belonging to the corresponding group IDs with each other in an random access process. In particular, a lot of M2M mobile stations perform random access processes as soon as they receive a single paging message. If a lot of M2M mobile stations attempt random accesses at the same time, uplink interference occurs. And, it may cause a problem that probability of occurrence of collision between the random access attempting mobile stations (e.g., M2M mobile stations, HTC mobile station, etc.) may increase. Hence, a method of distributing random accesses of M2M mobile stations is necessary.

In order to implement a method of distributing random accesses of M2M mobile station, which is proposed by the present invention, a method for an M2M mobile station to transmit information on its type and properties is described as follows.

First of all, an M2M mobile station delivers its type and properties to a base station in the course of entering (or reentering) a network or switching its state to an idle state. For example, as mentioned in the foregoing description, the M2M mobile station types or application types may include (1) security, (2) public safety, (3) tracking and tracing, (4) payment, (5) healthcare, (6) remote maintenance and control, (7) metering, (8) consumer device, (9) POS (Point Of Sales) and Fleet Management in security related market, (10) M2M communication of vending machine (11) smart meter for plant and machinery remote monitoring, operating time measurement on measurement on construction plant and machinery and auto-measurement of consumed heat or electricity quantity on construction plant and machinery, (12) Surveillance Video communication, and the like. And, the M2M mobile station application types can be further diversified.

For instance, in case of '(9) POS (Point Of Sales) and Fleet Management in security related market', the property of the M2M mobile station may include operating/standing-by/service interruption. The property of '(12) Surveillance Video communication' type may include 'triggering in always-on state or on occasion of event occurrence, a presence or non-presence of real-time traffic, a presence or non-presence of mobility or the like.

Thus, the M2M mobile station may be able to inform the base station of its type and property to the base station in the course of entering (or reentering) a network or switching its state to an idle state. For instance, in IEEE 802.16 system (e.g., IEEE 802.16e, IEEE 802.16m, IEEE 802.16p), an M2M mobile station is able to transmit its type and property to a base station via one of a ranging request message, a registration request message, a basic capability negotiation request message, a dynamic service related message and the like. Moreover, the M2M mobile station may be able to transmit information on type and property to the base station via a deregistration message in the course of entering an idle state for example.

In 3GPP system (e.g., HSPDA, UMTS, LTE), an M2M mobile station is able to transmit information on type and property of a mobile station to a base station via one of messages related to connection (re)establishment in a network connection (re)establishment procedure for example. Moreover, the M2M mobile station may be able to transmit information on type and property to the base station in the course of entering an idle state via a message related to a connection release for example.

In the following description, a method of determining a priority per M2M mobile station is explained for a method of distributing random accesses of M2M mobile stations according to the present invention.

First of all, in a procedure for a corresponding M2M mobile station to enter an idle state, a base station may be able to deliver information on type and property of the corresponding M2M mobile station to a paging controller (PC) or a mobility management entity (MME). If so, the paging controller (PC) or the mobility management entity (MME) performs mobile station grouping in accordance with the type and property of the corresponding M2M mobile station and is then able to assign a paging group identifier (ID) per the grouped group. Since a terminology 'paging group identifier' has been already used by a conventional system to mean an identifier of a group resulting from logically dividing base station within a single service provider network, 'paging mobile station (device) group identifier (PMGID)' shall be used by the present invention as a terminology for indicating a grouped group identifier based on type and property of an M2M mobile station. Such a terminology is just one example and may be non-limited by 'paging mobile station (device) group identifier (PMGID)'.

The processor 180 of the base station may be able to configure a single paging mobile station group to include M2M mobile stations having the same type and/or property. The processor 180 of the base station may be able to determine a priority for a random access per paging mobile station group. In doing so, the processor 180 of the base station may be able to assign a contention resolution level for a random access to each paging mobile station group in accordance with a priority. For instance, the processor 180 of the base station assigns contention resolution level 1 to a paging mobile station group having a top priority and then assigns contention resolution levels 2 to N to the rest of the paging mobile station groups in order of higher priorities, respectively. A random access waiting time, which may be named a waiting offset time or the like, corresponding to the contention resolution level (e.g., contention resolution level 1) assigned to the group having a high priority may be shorter than a random access waiting time of a contention resolution level (e.g., contention resolution level 2, contention resolution level 3, . . . contention resolution level N) assigned to a group having a relatively low priority. In particular, the random access waiting time of each of the M2M mobile stations belonging to the paging mobile station group having the high priority may be shorter.

A random access waiting time, a backoff window size or the like may be determined in advance in accordance with a contention resolution level and such information may be shared between a base station and mobile stations. Alternatively, a base station determines a contention resolution level, a random access waiting time and a backoff window size and may be then able to deliver the determined information to each paging mobile station group via a paging message. The paging message may contain random access configuration information. And, the random access configuration information may contain random access parameters. Contention resolution level, random access waiting time information, backoff window size information and the like may become random access parameters.

Table 2 in the following shows examples of random access waiting time information and backoff window size information.

TABLE 2

| Contention resolution level | Random access waiting time | Backoff window size |
|---|---|---|
| 1 | 20 ms | 0~7 |
| 2 | 50 ms | 4~15 |
| ... | ... | ... |

Referring to Table 2, a random access waiting time may mean a time for each M2M mobile station belonging to a specific paging mobile station group to wait from a timing point of receiving a paging message for requesting a network reentry from a base station until performing a random access procedure (i.e., to a backoff algorithm start point). And, a backoff window size may mean a maximum time or maximum random access opportunities/RACH count for a corresponding mobile station to wait after the end of the random access waiting time until transmitting a random access code.

In this case, the corresponding backoff window size may be defined as a value resulting from multiplying a contention resolution level by a backoff value for a general mobile station (e.g., HTC mobile station) in system information (e.g., UCD (uplink channel descriptor) in IEEE 802.16e system, super frame header (SFH) in IEEE 802.16m system, BCH in 3GPP, etc.). The M2M mobile station waits by a value randomly selected from a corresponding window size and may be then able to transmit a random access code. This shall be described later.

According to a method of distributing random accesses of M2M mobile stations staying in idle state, paging mobile station groups are determined by grouping the M2M mobile stations based on types and/or properties of the M2M mobile stations and the random accesses can be distributed primarily by assigning different contention resolution levels to the paging mobile station groups, respectively. In particular, the processor 180 of the base station may be able to assign a different contention resolution level having a random access waiting time to each paging mobile station group. Moreover, it may be able to further distribute random accesses secondarily in a manner that each of the M2M mobile stations in the paging mobile station group or each of the M2M mobile stations having the same contention resolution level assigned thereto selects a value in a backoff window size interval randomly and then attempts a random access at the timing of the corresponding value.

Moreover, the processor 180 of the base station may be able to assign a backoff window size interval differentiated in accordance with a paging mobile station group or a contention resolution level to M2M mobile station.

The step-by-step random access distributing method proposed by the present invention considers the following assumption as one example. For instance, a size of a minimum backoff window of a general mobile station, which is transmitted by a base station via system information (e.g., BCCH (broadcast control channel), SFH, UCD), is 0~7 and 2 random access opportunities exist per 5 ms. In this case, the base station, the paging controller or the mobility management entity (MME) is able to transmit size information of a maximum backoff window) to M2M mobile stations. And, the minimum backoff window size is used for a 1$^{st}$ contention resolution.

Each time a mobile station fails in a random access, 2 is the exponent to which a previous window size is raised (e.g., refer to truncated binary exponential backoff algorithm). And, a maximum backoff window means an increasable maximum size. One example of a step-by-step random access distributing method according to the present invention is described with reference to FIG. 3 and FIG. 4 as follows.

Figure 3:
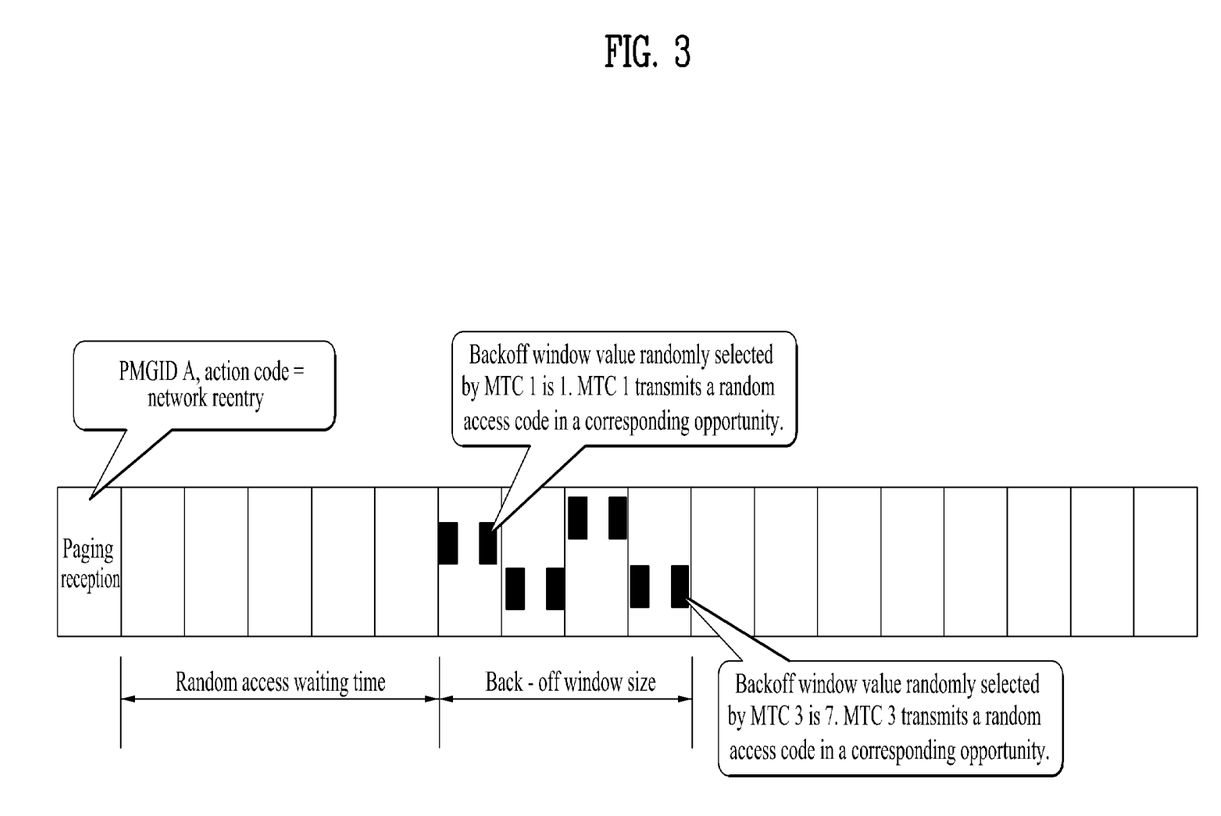
FIG. 3 is a diagram to describe one example of a random access distributing method per step according to one embodiment of the present invention.

FIG. 3 is a diagram to describe one example of a random access distributing method per step according to one embodiment of the present invention.

Referring to FIG. 3, assume that a base station determines a paging mobile station group identifier 'PMGID A', a contention resolution level '1' and a random access waiting time '25 ms' for M2M mobile station 1 (i.e., MTC 1) and M2M mobile station 3 (i.e., MTC 3) and then delivers the determined identifier, contention resolution level and random access waiting time to the corresponding M2M mobile stations. A method of determining a backoff window size corresponding to the contention resolution level 1 is schematically explained as follows. First of all, the processor 180 of the base station is able to calculate a backoff window size of the M2M mobile station, which corresponds to a minimum backoff window size value of a general mobile station and a contention resolution level assigned to a corresponding paging mobile station group (or a corresponding M2M group). In this case, a method of calculating a maximum backoff window size shall be omitted from the following description.

The processor 180 of the base station may be able to calculate a backoff window size of M2M mobile station by calculating a minimum backoff window start and end values for the M2M mobile station. In particular, the processor 180 of the base station may be able to calculate the minimum backoff window start value for the M2M mobile station using Formula 1.

Minimum Backoff window start value=minimum backoff window start value for general mobile station*contention resolution level  [Formula 1]

For instance, if a minimum backoff window start value for a general mobile station is set to 0 in advance, the processor 180 of the base station is able to calculate a minimum backoff window start value into '0' by multiplying the minimum backoff window start value '0' for the general mobile station by the contention resolution level 1 assigned to M2M mobile station 1 and M2M mobile station 3 [0*1=0]. Subsequently, the processor 180 of the base station is able to calculate a minimum backoff window end value for the M2M mobile station using Formula 2.

Minimum Backoff window end value=minimum backoff window end value for general mobile station*contention resolution level  [Formula 2]

For instance, if a minimum backoff window end value for a general mobile station is set to 7 in advance, the processor 180 of the base station is able to calculate a minimum backoff window end value into '7' by multiplying the minimum backoff window end value '7' for the general mobile station by the contention resolution level 1 assigned to M2M mobile station 1 and M2M mobile station 3 [7*1=7]. In particular, the processor 180 of the base station may be able to aware that the minimum backoff end value for M2M mobile station 1 and M2M mobile station 3 is 7.

Meanwhile, for another example, the processor 180 of the base station may be able to calculate a minimum backoff window end value for M2M mobile station 1 and M2M mobile station 3 using Formula 3.

Minimum Backoff window end value=
$2^{\{x+(contention\ resolution\ level-1)\}}-1$  [Formula 3]

In Formula 3, 'x' indicates a minimum backoff window value of a general mobile station, which is transmitted via system information.

As the minimum backoff window value of a general mobile station, which is transmitted via system information, is 3 and the contention resolution level 1 is assigned to M2M mobile station 1 and M2M mobile station 3, the minimum backoff window end value of the M2M mobile station becomes 7 ($=2^{\{3+(1-1)\}}-1$) by Formula 3.

In this case, the backoff window end value is calculated by Formula 2 or Formula 3 only and the backoff window start value may be fixed to a specific value (e.g., 0).

The base station may be able to transmit a paging message containing the paging mobile station group identifier 'PMGID A' and the action code indicating a network reentry to the M2M mobile station 1 and the M2M mobile station 3. Moreover, the base station may be able to transmit the paging message to the M2M mobile station 1 and the M2M mobile station 3 in a manner that the information (e.g., contention resolution level 1) on the contention resolution level, the random access waiting time information and the backoff window size information are further contained in the paging message.

Therefore, each of the M2M mobile station 1 and the M2M mobile station 3 may be able to be aware of the random access waiting time and the backoff window size interval corresponding to the received contention resolution level 1. In this case, the processor 155 of the M2M mobile station may be able to select a random backoff window value (or a random access opportunity) within the backoff window size interval (e.g., backoff window 0~7). For instance, the processor 155 of the M2M mobile station 1 is able to select a random backoff window value '1'. And, referring to FIG. 3, the M2M mobile station 1 is able to transmit a random access code in the corresponding random access opportunity. Moreover, the processor 155 of the M2M mobile station 3 is able to select a random backoff window value '7'. And, referring to FIG. 3, the M2M mobile station 3 is able to transmit a random access code in the corresponding random access opportunity.

Thus, although M2M mobile stations belong to the same paging mobile station group or the same contention resolution level is assigned to the M2M mobile stations, a random access code is transmitted in a random access opportunity matching a corresponding backoff window value based on a backoff window value randomly selected within the established backoff window range. Therefore, a random access collision can be prevented and random accesses can be distributed.

Figure 4:
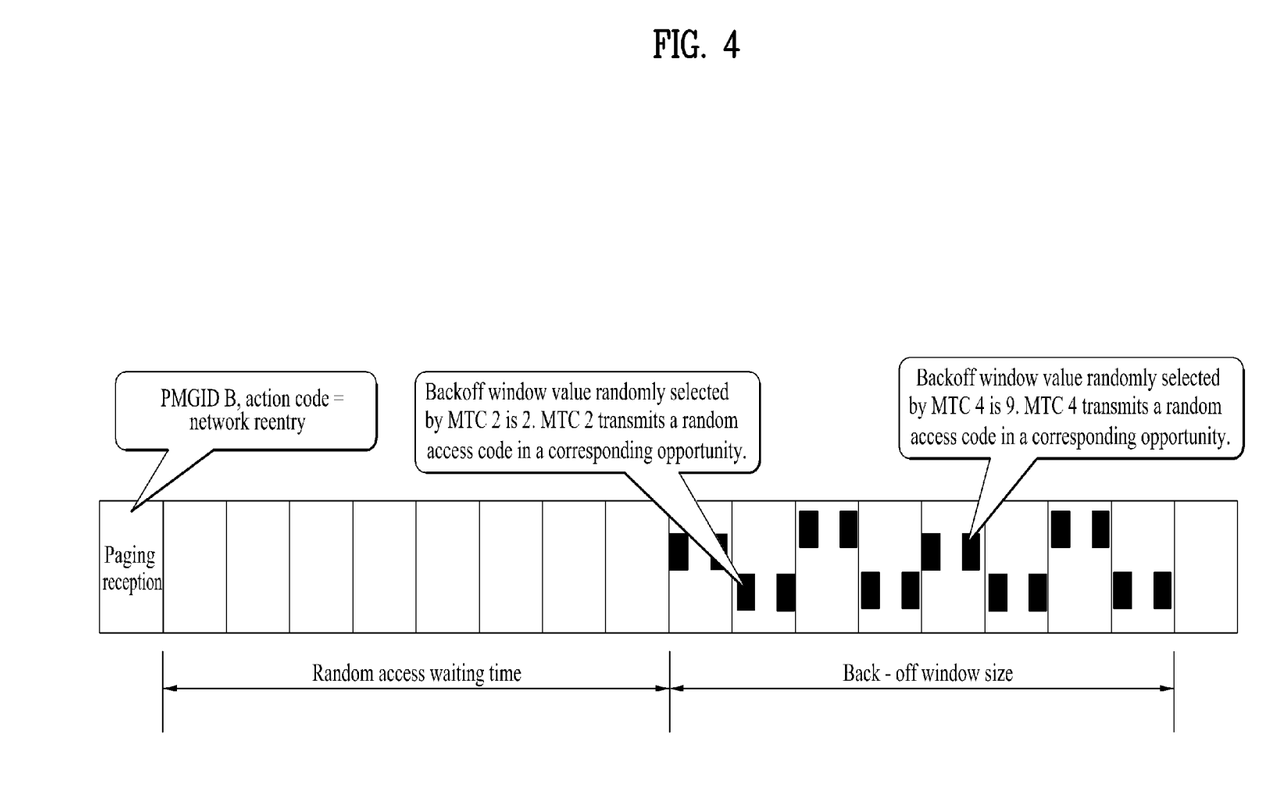
FIG. 4 is a diagram to describe another example of a random access distributing method per step according to one embodiment of the present invention.

FIG. 4 is a diagram to describe another example of a random access distributing method per step according to one embodiment of the present invention.

Referring to FIG. 4, assume that a base station determines a paging mobile station group identifier 'PMGID B', a contention resolution level '2' and a random access waiting time '40 ms' for M2M mobile station 2 (i.e., MTC 2) and M2M mobile station 4 (i.e., MTC 4) and then delivers the determined identifier, contention resolution level and random access waiting time to the corresponding M2M mobile stations. The base station may be able to transmit a paging message containing the paging mobile station group identifier TMGID B' and the action code indicating a network reentry to the M2M mobile station 2 and the M2M mobile station 4. Moreover, the base station may be able to transmit the paging message to the M2M mobile station 2 and the M2M mobile station 4 in a manner that the information (e.g., contention resolution level 2) on the contention resolution level, the random access waiting time information and the backoff window size information are further contained in the paging message.

Therefore, each of the M2M mobile station 2 and the M2M mobile station 4 may be able to aware of the random access waiting time and the backoff window size interval corresponding to the received contention resolution level 2.

As mentioned in the foregoing description with reference to FIG. 3, the processor 180 of the base station is able to calculate a backoff window size for the M2M mobile station 2 and the M2M mobile station 4 in accordance with a minimum backoff window size value of a general mobile station and a contention resolution level. The processor 180 of the base station is able to calculate a backoff window size of an M2M mobile station by calculating minimum backoff window start and end values for the M2M mobile station. The processor 180 of the base station may be able to calculate the minimum backoff start value for the M2M mobile station 2 and the M2M mobile station 4 using Formula 1. For instance, if a minimum backoff window start value for a general mobile station is set to 0 in advance, the processor 180 of the base station may be able to calculate the minimum backoff window start value by multiplying the minimum backoff window start value '0' for the general mobile station by the contention resolution level '2' assigned to the M2M mobile station 2 and the M2M mobile station 4 [0*2=0]. In particular, the processor 180 of the base station determines the minimum backoff window start value for the M2M mobile station 2 and the M2M mobile station 4 as 0.

As mentioned in the foregoing description with reference to FIG. 3, the processor 180 of the base station may be able to calculate a minimum backoff window end value for the M2M mobile station 2 and the M2M mobile station 4 using Formula 2. For instance, if a minimum backoff window end value for a general mobile station is set to 0 in advance, the processor 180 of the base station may be able to calculate the minimum backoff window end value by multiplying the minimum backoff window end value '7' for the general mobile station by the contention resolution level '2' assigned to the M2M mobile station 2 and the M2M mobile station 4 [7*2=14]. In particular, the processor 180 of the base station determines the minimum backoff window end value for the M2M mobile station 2 and the M2M mobile station 4 as 14. For another instance, the processor 180 of the base station may be able to calculate the minimum backoff window end value for the M2M mobile station 2 and the M2M mobile station 4 using Formula 3. In this case, according to Formula 3, the minimum backoff window end value for the M2M mobile station can be calculated into 15 ($=2^{\{3+(2-1)\}}-1$) according to Formula 3.

Each of the M2M mobile station 2 and the M2M mobile station 4 may be aware of a random access waiting time (e.g., 40 ms) and a backoff window size interval (0~15) corresponding to the contention resolution level 2 received from the base station. In this case, the processor 155 of each of the M2M mobile station 2 and the M2M mobile station 4 is able to select a random backoff window value within the backoff window size interval (e.g., backoff window 0~15).

For instance, the processor 155 of the M2M mobile station 2 is able to select a random backoff window value '2'. Referring to FIG. 4, the M2M mobile station 2 is able to transmit a random access code in a corresponding random access opportunity. And, the processor 155 of the M2M mobile station 4 is able to select a random backoff window value '9'. Referring to FIG. 4, the M2M mobile station 4 is able to transmit a random access code in a corresponding random access opportunity.

Figure 5:
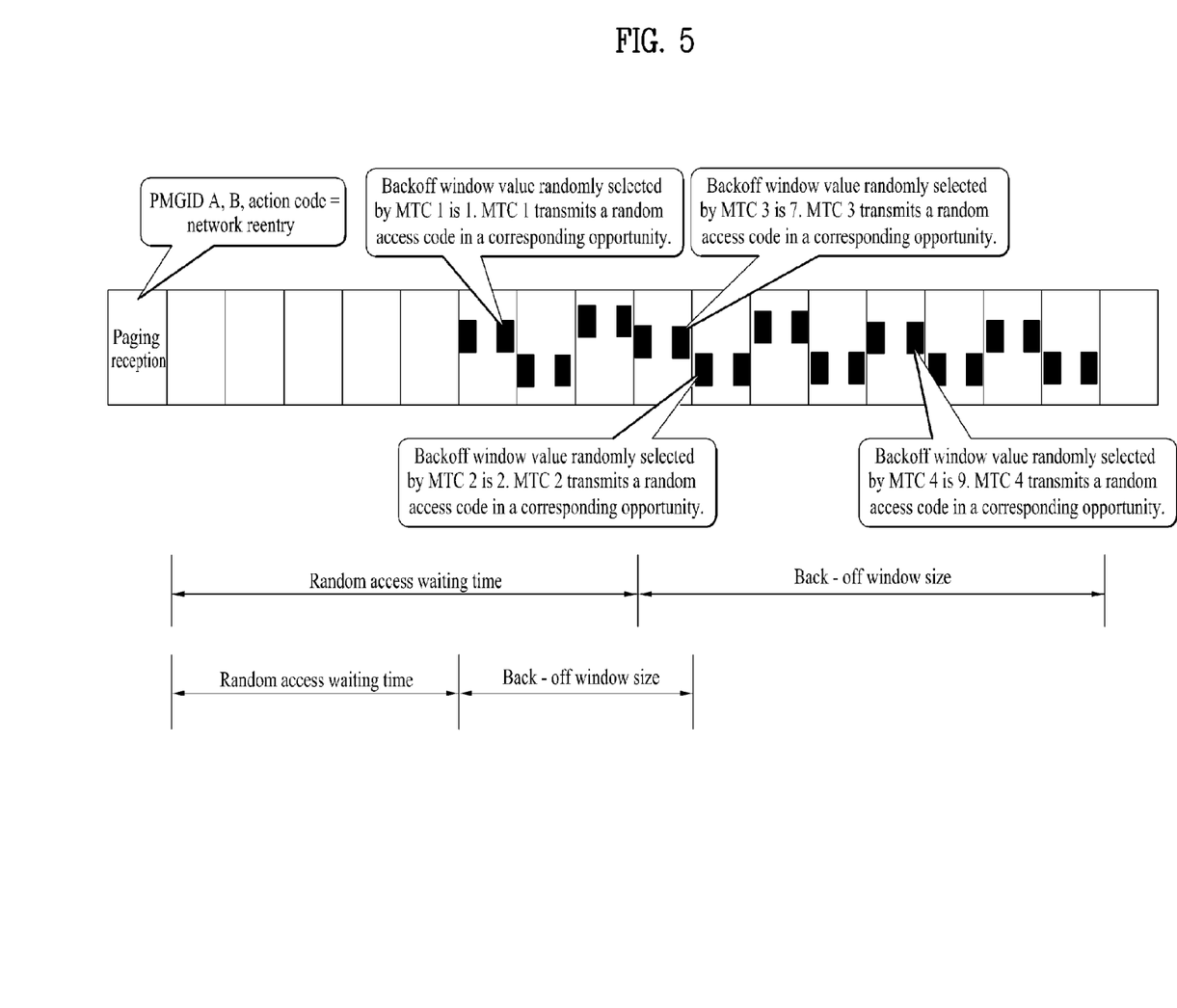
FIG. 5 is a diagram to describe a further example of a random access distributing method per step according to one embodiment of the present invention.

Thus, although M2M mobile stations (e.g., M2M mobile station 2 and M2M mobile station 4) belong to the same paging mobile station group or the same contention resolution level is assigned to the M2M mobile stations, a random access code is transmitted in a random access opportunity matching a corresponding backoff window value based on a backoff window value randomly selected within the established backoff window range. Therefore, a random access collision can be prevented and random accesses can be distributed. FIG. 3 or FIG. 4 shows one example of the random access distributing method for the M2M mobile stations belonging to a specific paging mobile station group. With reference to FIG. 5, a method of distributing random accesses in a manner of differentiating a random access waiting time per specific paging mobile station group as well as within the specific paging mobile station group (or M2M group) is described as follows.

FIG. 5 is a diagram to describe a further example of a random access distributing method per step according to one embodiment of the present invention.

Referring to FIG. 5, the processor 180 of the base station groups M2M mobile station 1 (i.e., MTC 1) and M2M mobile station 3 (i.e., MTC 3) into a paging mobile station group and then assigns a paging mobile station group identifier 'PMGID A' thereto. The processor 180 of the base station groups M2M mobile station 2 (i.e., MTC 2) and M2M mobile station 4 (i.e., MTC 4) into another paging mobile station group and then assigns a paging mobile station group identifier 'PMGID B' thereto. The processor 180 of the base station assigns a contention resolution level '1' to the paging mobile station group identifier PMGID A and also assigns a contention resolution level '2' to the paging mobile station group identifier PMGID B. Subsequently, the base station may be able to deliver a contention resolution level assigned per paging mobile station group. In doing so, the base station may be able to inform each paging mobile station group of the random access waiting time information and the backoff window size interval information, which correspond per contention resolution level.

In FIG. 5, for clarity, assume that the contention resolution level (i.e., contention resolution level 1), the random access waiting time (25 ms) and the backoff window size interval information (i.e., backoff window 0~7), which are assigned in FIG. 3, are identically assigned to the M2M mobile stations 1 and 3 having the PGMID A assigned thereto. And, assume that the contention resolution level (i.e., contention resolution level 2), the random access waiting time (40 ms) and the backoff window size interval information (i.e., backoff window 0~15), which are assigned in FIG. 4, are identically assigned to the M2M mobile stations 2 and 4 having the PGMID B assigned thereto.

Referring to FIG. 5, each of M2M mobile station 1 and M2M mobile station 3 may be able to receive a paging mobile station group identifier PGMID A and an action code for indicating a network reentry from a base station via a paging message. Likewise, each of M2M mobile station 2 and M2M mobile station 4 may be able to receive a paging mobile station group identifier PGMID B and an action code for indicating a network reentry from the base station via a paging message.

Having received the paging message, each paging mobile station group waits during a corresponding random access waiting time. Each of the mobile stations belonging to the corresponding paging mobile station group selects a random access opportunity (or ranging opportunity) based on an indicated backoff window size information.

For instance, each of the M2M mobile station 1 and the M2M mobile station 3, to which the paging mobile station group identifier PGMID A and the contention resolution level 1 are assigned, waits during the random access waiting time '25 ms' and may be then able to transmit a random access code in the random access opportunity randomly selected within an indicated backoff window range. In doing so, referring to FIG. 5, the M2M mobile station 1 may be able to randomly select a backoff window value 1 and transmit the random access code in the random access opportunity matching the corresponding backoff window value. And, the M2M mobile station 3 may be able to randomly select a backoff window value 7 and transmit the random access code in the random access opportunity matching the corresponding backoff window value. Hence, random accesses of the M2M mobile stations having the same contention resolution level 1 can be distributed.

Meanwhile, each of the M2M mobile station 2 and the M2M mobile station 4, to which the paging mobile station group identifier PGMID B and the contention resolution level 2 are assigned, waits during the random access waiting time '40 ms' and may be then able to transmit a random access code in the random access opportunity randomly selected within an indicated backoff window range. In doing so, referring to FIG. 5, the M2M mobile station 2 may be able to randomly select a backoff window value 2 and transmit the random access code in the random access opportunity matching the corresponding backoff window value. And, the M2M mobile station 4 may be able to randomly select a backoff window value 9 and transmit the random access code in the random access opportunity matching the corresponding backoff window value. Likewise, random accesses of the M2M mobile stations having the same contention resolution level 2 can be distributed.

Moreover, the base station assigns a different random access waiting time by assigning a different contention resolution level to each paging mobile station group identifier, thereby distributing random access attempts among paging mobile station groups.

According to the embodiments mentioned in the above description, random accesses are distributed per paging mobile station group in a manner of grouping M2M mobile stations and then assigning a different contention resolution level and a different random access waiting time to each paging mobile station group and each of the M2M mobile stations belonging to the same paging mobile station group is enabled to randomly select a value within a backoff window range. Therefore, the present invention is advantageous in distributing random accesses within the same paging mobile station group.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Accordingly, a method of distributing a random access, method of distributing and performing a random access and apparatus therefor are industrially available for various wireless communication systems including 3GPP LTE, LTE-A, IEEE 802 and the like.

What is claimed is:
1. A method of distributing a random access of mobile stations by a base station in a wireless communication system, the method comprising:

receiving, from the mobile stations, information related to mobile station types and mobile station properties;
grouping the mobile stations into a plurality of mobile station groups based on the received information;
allocating a different random access priority to each of the mobile station groups, respectively;
determining a random access waiting time for each of the mobile station groups to start a random access procedure differently based on the respective random access priority;
determining backoff window upper limits for each of the mobile station groups based on the respective random access priority; and
transmitting a paging message indicating a network reentry to the mobile station groups,
wherein the paging message comprises identifier information of the mobile station groups and random access configuration information of the mobile station groups, the random access configuration information including information on the random access waiting time and information on the backoff window upper limits.

2. The method of claim 1, wherein the backoff window upper limits correspond to a maximum time to wait to perform, by each of the mobile stations, the random access after the random access waiting time expires.

3. The method of claim 1, wherein the information related to mobile station types and mobile station properties is received during at least one of a network entry procedure, a network re-entry procedure, a network connection establishment procedure and a network connection re-establishment procedure.

4. The method of claim 1, wherein each of the mobile stations comprises a machine-to-machine (M2M) device type.

5. The method of claim 1, wherein the corresponding random access waiting time of the mobile station groups is determined based on the different random access priority allocated to each of the mobile station groups, respectively.

6. The method of claim 1, further comprising:
receiving, from the mobile station groups, a random access code via a random access opportunity in accordance with the information on the random access waiting time and the information on the backoff window upper limits of each of the mobile station groups.

7. A method of performing a random access by a first mobile station in a wireless communication system, the method comprising:
transmitting, to a base station, information related to a mobile station type and a mobile station property;
receiving, from the base station, information related to a mobile station group which the first mobile station belongs to,
wherein one or more other mobile stations belonging to the mobile station group have a same random access priority as the first mobile station; and
receiving a paging message indicating a network reentry from the base station,
wherein the paging message comprises identifier information of the mobile station group having the first mobile station grouped therein and random access configuration information of the mobile station group, the random access configuration information including information on a random access waiting time and information on backoff window upper limits.,
wherein the random access waiting time is determined for the mobile station group to start a random access procedure based on the random access priority, and wherein the backoff window upper limits are determined based on the random access priority.

8. The method of claim 7, wherein the backoff window upper limits correspond to a maximum time to wait to perform, by each of the mobile stations belonging to the mobile station group, the random access after the random access waiting time expires.

9. The method of claim 8, further comprising:
selecting a random access opportunity based on the random access configuration information.

10. The method of claim 9, further comprising:
transmitting a random access code to the base station in the selected random access opportunity.

11. The method of claim 7, wherein the information related to the mobile station type and the mobile station property is transmitted during at least one of a network entry procedure, a network re-entry procedure, a network connection establishment procedure and a network connection re-establishment procedure.

12. The method of claim 7, wherein the first mobile station comprises a machine-to-machine (M2M) device type.

13. The method of claim 7, wherein the random access waiting time of the mobile station group is determined based on the random access priority of the mobile stations belonging to the mobile station group.

14. A base station apparatus for distributing a random access of mobile stations in a wireless communication system, the base station apparatus comprising:
a radio frequency (RF) module; and
a processor configured to control the RF module,
wherein the processor is further configured to:
receive, of the mobile stations, information related to mobile station types and mobile station properties,
group a plurality of mobile station groups based on the received information,
allocate a different random access priority to each of the mobile station groups, respectively,
determine a random access waiting time for each of the mobile station groups to start a random access procedure differently based on the respective random access priority,
determine backoff window upper limits for each of the mobile station groups based on the respective random access priority, and
transmit a paging message indicating a network reentry to the mobile station groups,
wherein the paging message comprises identifier information of the mobile station groups and random access configuration infoimation of the mobile station groups, the random access configuration information including information on the random access waiting time and information on the backoff window upper limits.

15. A first mobile station apparatus for performing a random access in a wireless communication system, the first mobile station apparatus comprising:
a radio frequency (RF) module; and
a processor configured to control the RF module,
wherein the processor is further configured to:
transmit, to a base station, information related to a mobile station apparatus type and a mobile station apparatus property ,
receive, from the base station, information related to a mobile station apparatus group which the first mobile station apparatus belongs to, wherein one or more other mobile station apparatuses belonging to the mobile station apparatus group have a same random access priority as the first mobile station apparatus, and receive a paging message indicating a network reentry from the base station, wherein the paging message comprises identifier information of the mobile station apparatus group having the first mobile station apparatus grouped therein and random access configuration information of the mobile station apparatus group, the random access configuration information including information on a random access waiting time and information on backoff window upper limits, wherein the random access waiting time is determined for the mobile station apparatus group to start a random access procedure based on the random access priority, and wherein the backoff window upper limits are determined based on the random access priority.

16. The first mobile station apparatus of claim 15,
wherein the processor is further configured to select a random access opportunity based on the random access configuration information.

17. The first mobile station apparatus of claim 16,
wherein the processor is further configured to transmit a random access code to the base station in the selected random access opportunity.

18. The method of claim 1, further comprising:
allocating a contention resolution level to the mobile station apparatus group based on the random access priority.

19. The first mobile station apparatus of claim 18, wherein the backoff window upper limits are determined in proportion to the contention resolution level.

* * * * *